US011891206B2

(12) United States Patent
Testoni et al.

(10) Patent No.: US 11,891,206 B2
(45) Date of Patent: Feb. 6, 2024

(54) SYSTEM FOR ASSEMBLING AND FILLING TWO GROUPS OF ELECTRONIC CIGARETTES

(71) Applicant: G.D S.p.A., Bologna (IT)

(72) Inventors: Luca Testoni, Castel Maggiore (IT); Massimo Sartoni, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 78 days.

(21) Appl. No.: 16/617,988

(22) PCT Filed: Jun. 27, 2018

(86) PCT No.: PCT/IB2018/054742
§ 371 (c)(1),
(2) Date: Nov. 27, 2019

(87) PCT Pub. No.: WO2019/003129
PCT Pub. Date: Jan. 3, 2019

(65) Prior Publication Data
US 2020/0189783 A1    Jun. 18, 2020

(30) Foreign Application Priority Data

Jun. 29, 2017   (IT) ................. 102017000072733

(51) Int. Cl.
*B65B 3/04*     (2006.01)
*B65B 35/16*    (2006.01)
(Continued)

(52) U.S. Cl.
CPC ............ *B65B 65/006* (2013.01); *A24F 40/70* (2020.01); *B65B 3/04* (2013.01); *B65B 43/52* (2013.01);
(Continued)

(58) Field of Classification Search
CPC ........ B65B 35/16; B65B 65/006; B67C 7/002
(Continued)

(56) References Cited

U.S. PATENT DOCUMENTS 3,382,644 A * 5/1968 Vogt ....................... B65B 43/04
53/455
3,986,320 A * 10/1976 Bausch .................. B65B 3/003
53/505
(Continued)

FOREIGN PATENT DOCUMENTS

| WO | 2015040568 A1 | 3/2015 | |
|---|---|---|---|
| WO | 2015140768 A2 | 9/2015 | |
| WO | WO-2015140768 A2 * | 9/2015 | ........... B65B 7/2821 |

OTHER PUBLICATIONS

International Search Report and Written Opinion dated Oct. 23, 2018 for counterpart International Patent Application No. PCT/IB2018/054742.

*Primary Examiner* — Thanh K Truong
*Assistant Examiner* — Patrick B Fry
(74) *Attorney, Agent, or Firm* — SHUTTLEWORTH & INGERSOLL, PLC; Timothy J. Klíma

(57) ABSTRACT

A system for assembling and filling two groups of electronic cigarettes, includes first and second working stations for assembly/inspection operations on a first group of electronic cigarettes and disposed upstream and downstream of a first conveying path, respectively. Third and fourth working stations perform assembly/inspection operations on a second group of electronic cigarettes and are disposed upstream and downstream of a second conveying path, respectively. A single filling station receives the first group at a first loading zone and the second group at a second loading zone to fill the first group and the second group with a filling product; and releases the first group of filled electronic cigarettes at a first unloading zone and the second group of filled elec- (Continued)

tronic cigarettes at a second unloading zone towards the second working station and towards the fourth working station, respectively.

14 Claims, 13 Drawing Sheets

(51) Int. Cl.
    *B65B 43/52*     (2006.01)
    *B65B 43/60*     (2006.01)
    *B65B 65/00*     (2006.01)
    *B67C 7/00*     (2006.01)
    *A24F 40/70*     (2020.01)
    *A24F 40/42*     (2020.01)

(52) U.S. Cl.
    CPC .............. *B65B 43/60* (2013.01); *A24F 40/42* (2020.01); *B65B 2210/02* (2013.01)

(58) Field of Classification Search
    USPC ............................................ 53/202; 198/570
    See application file for complete search history.

(56) References Cited

U.S. PATENT DOCUMENTS

| | | | | |
|---|---|---|---|---|
| 4,109,446 A * | 8/1978 | Krohn | ..................... | B67C 7/002 |
| | | | | 198/733 |
| 4,467,847 A * | 8/1984 | Zodrow | .................. | B67C 7/002 |
| | | | | 141/169 |
| 5,158,168 A * | 10/1992 | Bedin | ..................... | B67C 7/002 |
| | | | | 198/465.1 |
| 5,222,346 A * | 6/1993 | Wegscheider | .......... | B65B 63/08 |
| | | | | 53/127 |
| 7,278,531 B2 * | 10/2007 | Hartness | .............. | B65G 17/385 |
| | | | | 198/470.1 |
| 7,299,832 B2 * | 11/2007 | Hartness | ............... | B67C 3/2637 |
| | | | | 141/144 |
| 8,393,132 B2 * | 3/2013 | Waeckerlin | ............. | B65B 5/024 |
| | | | | 53/458 |
| 10,407,196 B2 * | 9/2019 | Slurink | .................. | B65B 39/12 |
| 10,850,874 B2 * | 12/2020 | Boldrini | ................. | B65B 43/52 |

\* cited by examiner

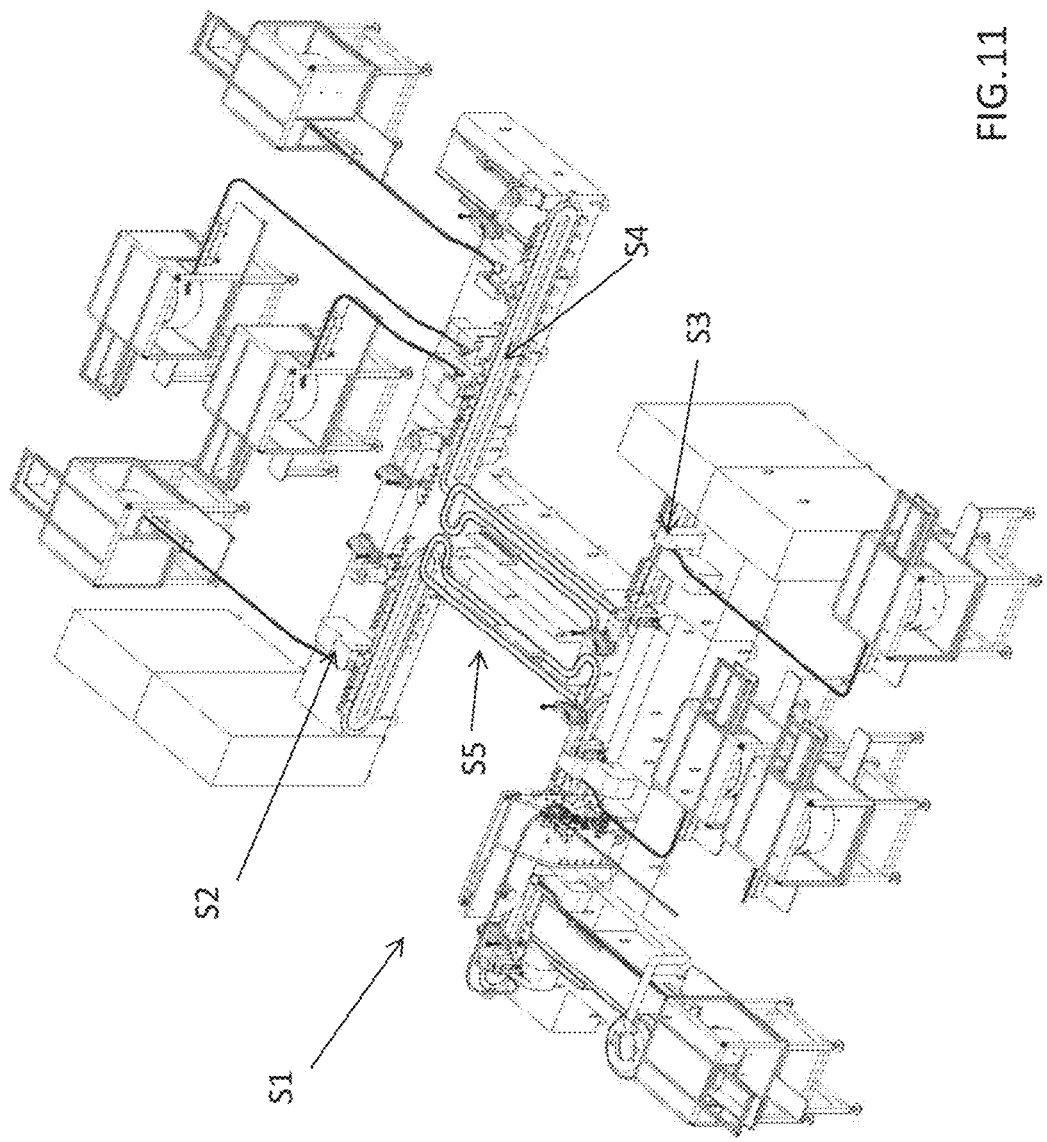
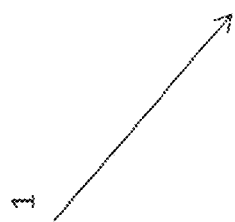
FIG.11

SYSTEM FOR ASSEMBLING AND FILLING TWO GROUPS OF ELECTRONIC CIGARETTES

This application is the National Phase of International Application PCT/I62018/054742 filed Jun. 27, 2018 which designated the U.S.

This application claims priority to Italian Patent Application No. 102017000072733 filed Jun. 29, 2017, which application is incorporated by reference herein.

TECHNICAL FIELD

This invention addresses the technical field of electronic cigarettes. More specifically, the invention relates to a system for assembling and filling two groups of electronic cigarettes.

BACKGROUND ART

As is known, electronic cigarettes are made up of different components which are assembled to each other. In recent times, the production of electronic cigarettes has become more and more automated; in particular, automatic stations are dedicated to operations which differ greatly from each other: for example, assembling the electronic components, filling the cartridges with the liquid to be vaporized, inspecting the assembled groups, etc.

In many cases, therefore, an electronic cigarette production installation occupies a great deal of space. The filling station in particular has considerably large overall dimensions. This often limits overall productivity because it is not possible to set up more than one assembly and filling line on the same factory floor. Moreover, productivity is often limited by the relatively low speed of the assembly lines, or by their relatively reduced flexibility.

DISCLOSURE OF THE INVENTION

This invention has for an aim to overcome the drawbacks described above.

This aim is achieved by proposing a system for assembling and filling two groups of electronic cigarettes according to the accompanying claims.

Advantageously, the system proposed allows increasing overall productivity not only because it allows assembling and filling two groups of electronic cigarettes simultaneously but also because it offers a high level of flexibility.

BRIEF DESCRIPTION OF THE DRAWINGS

Further advantages are more apparent in the specification which follows, with reference to the accompanying drawings, in which:

FIGS. 9-12 are views similar to those of FIGS. 1-4 but illustrate a third embodiment of a system according to the invention;

DETAILED DESCRIPTION OF PREFERRED EMBODIMENTS OF THE INVENTION

Figure 1:
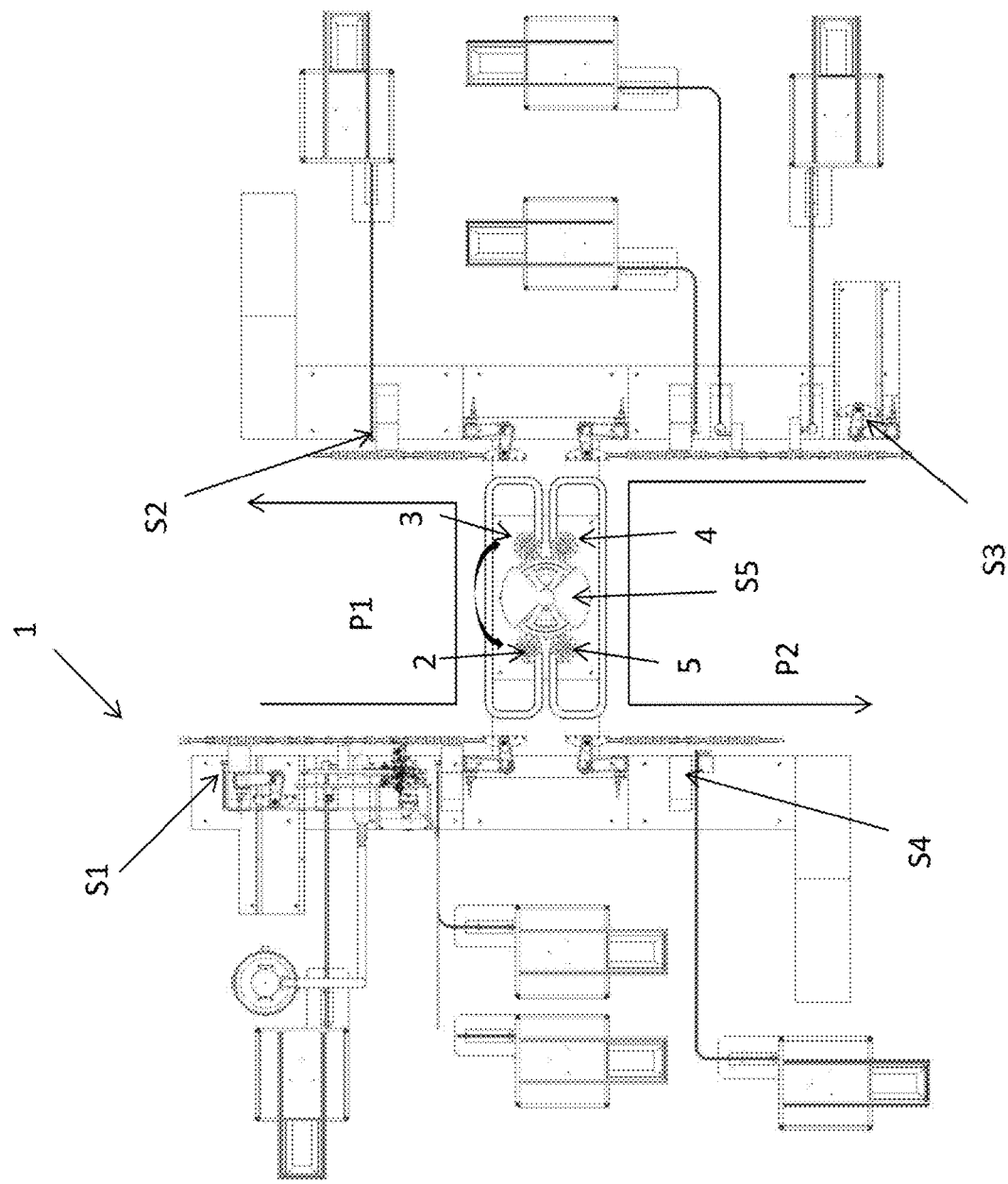
FIG. 1 is a plan view of a first embodiment of a system according to the invention.
Figure 2:
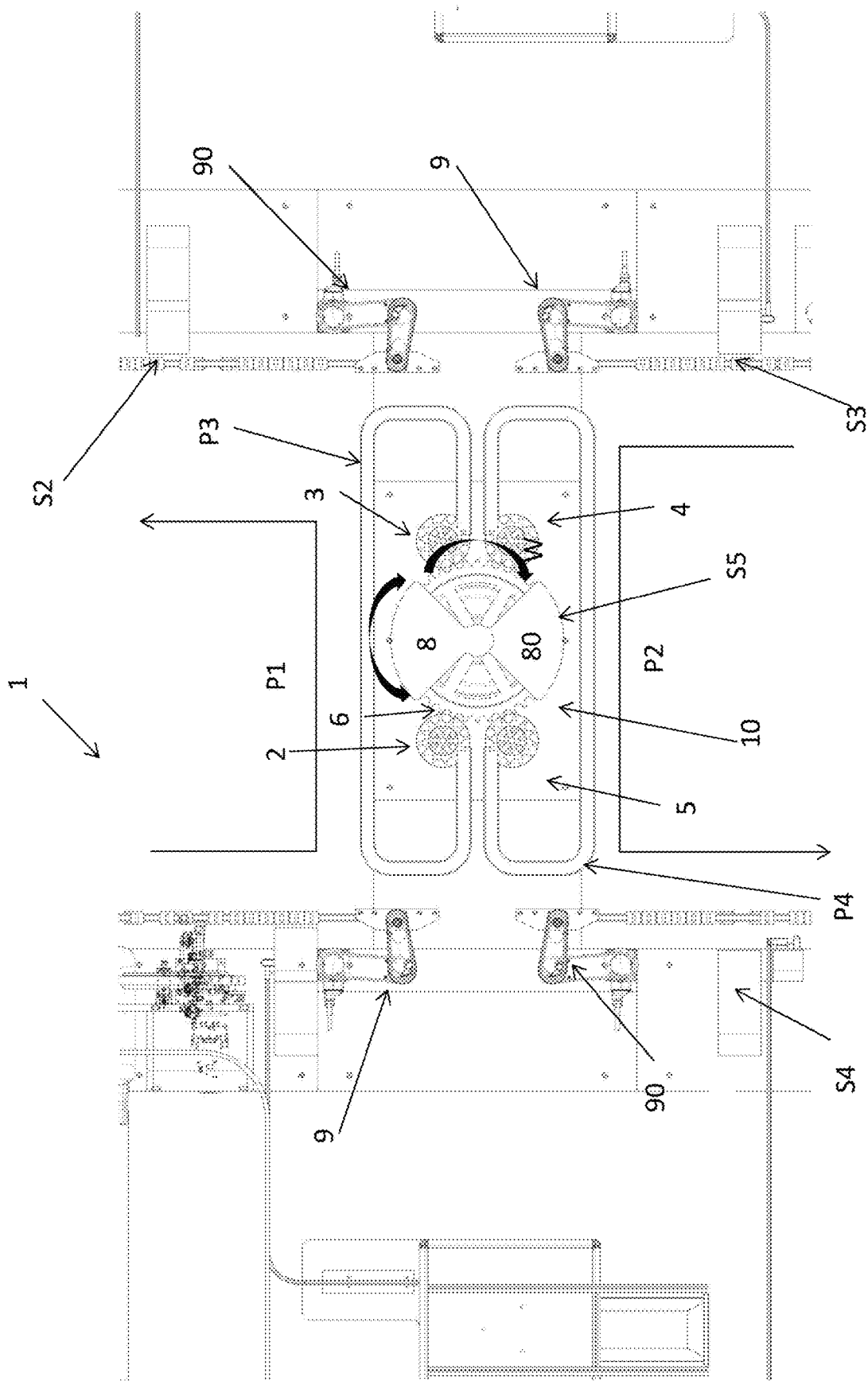
FIG. 2 is an enlarged view of FIG. 1.
Figure 3:
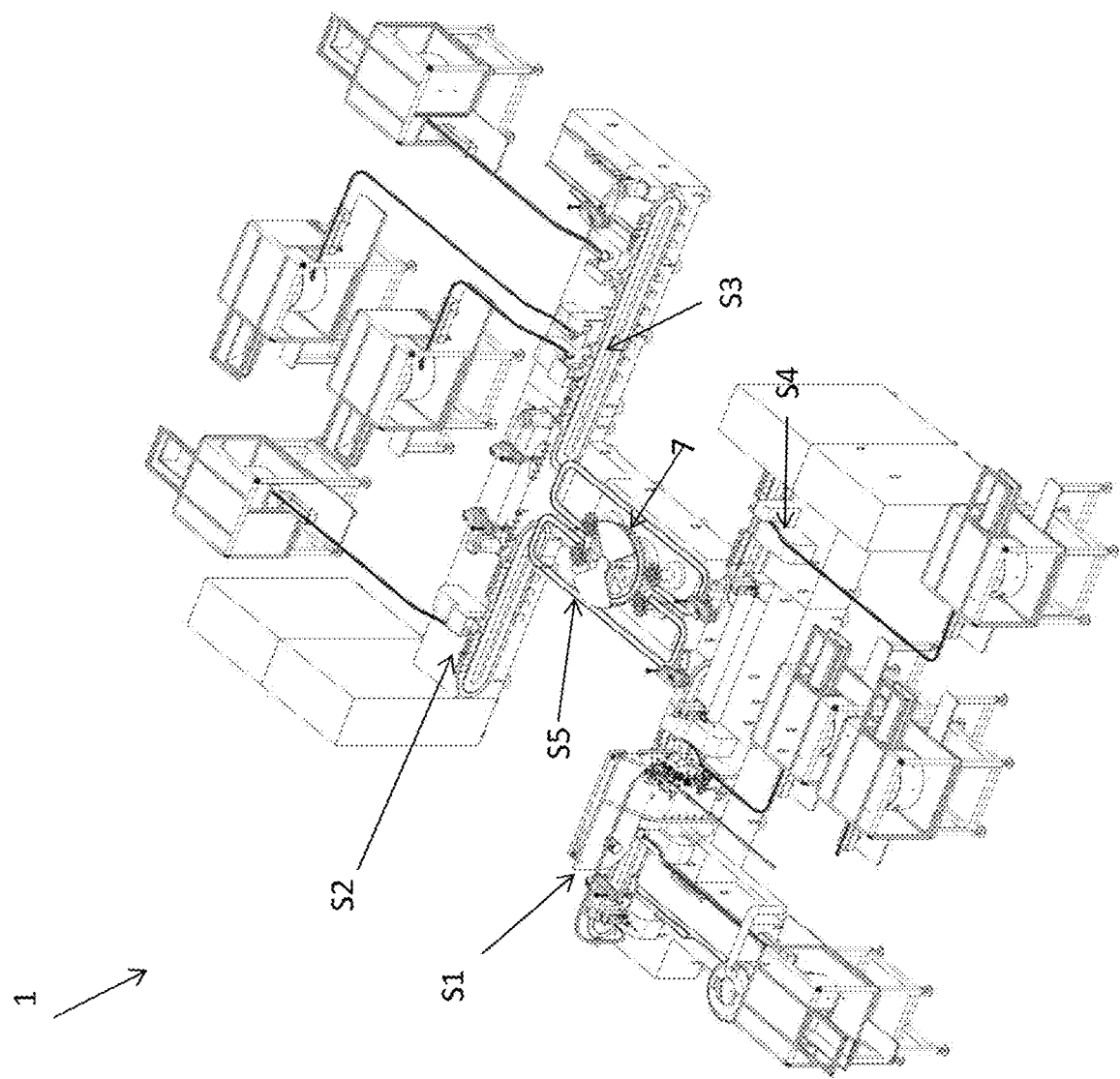
FIG. 3 is a perspective view of the system of FIG. 1.
Figure 4:
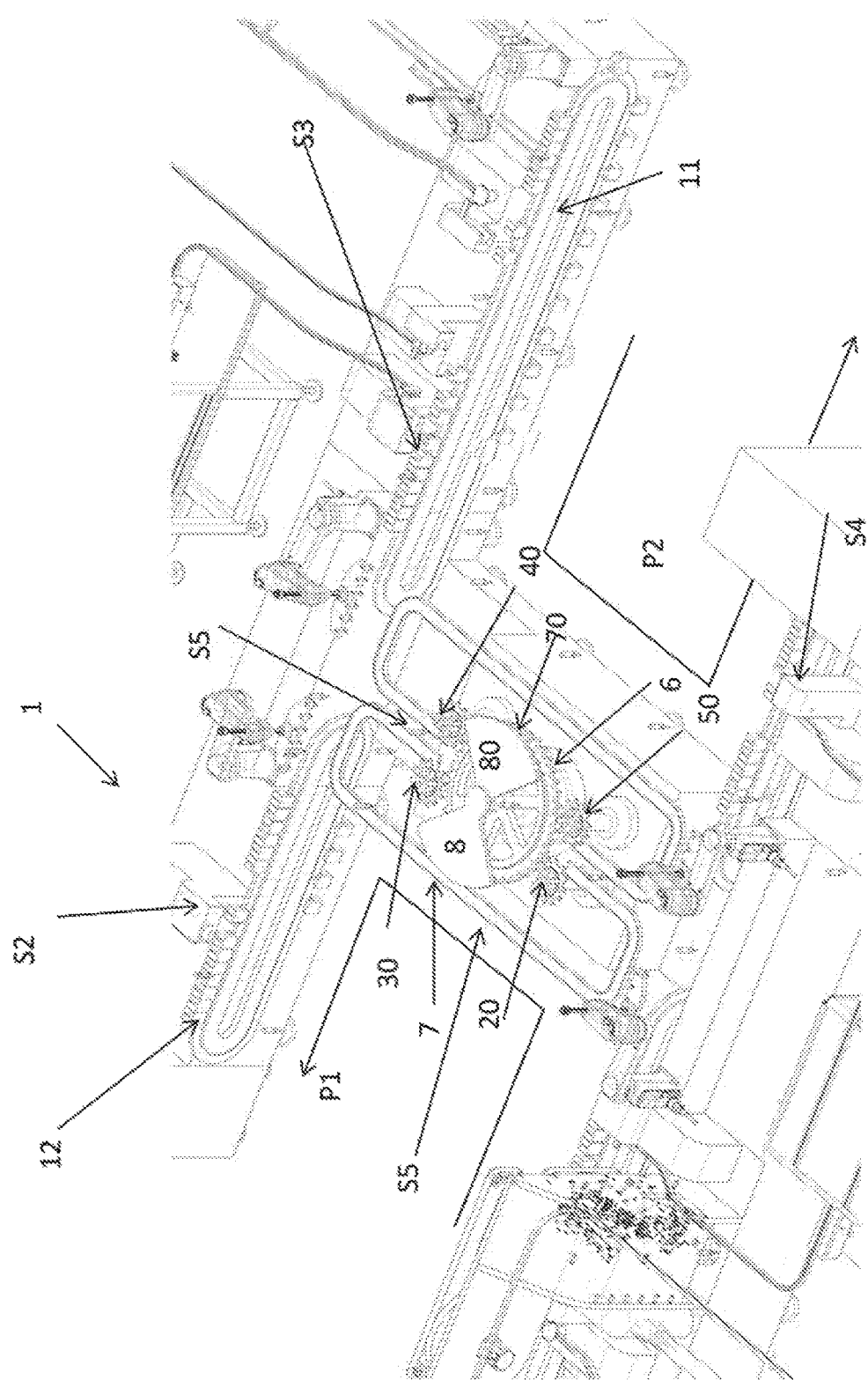
FIG. 4 is an enlarged view of FIG. 3.
Figure 5:
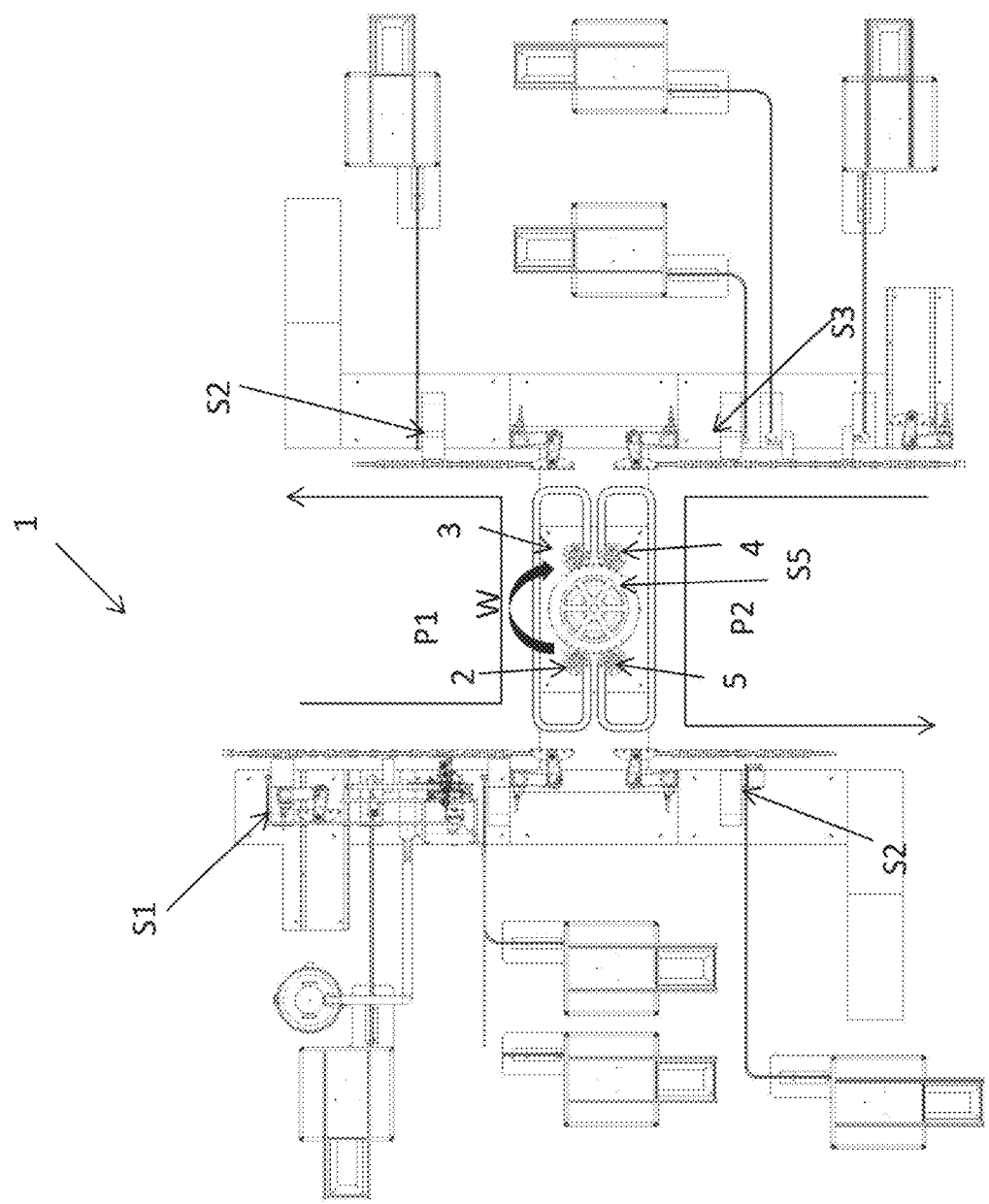
FIGS. 5-8 are views similar to those of FIGS. 1-4 but illustrate a second embodiment of a system according to the invention.
Figure 6:
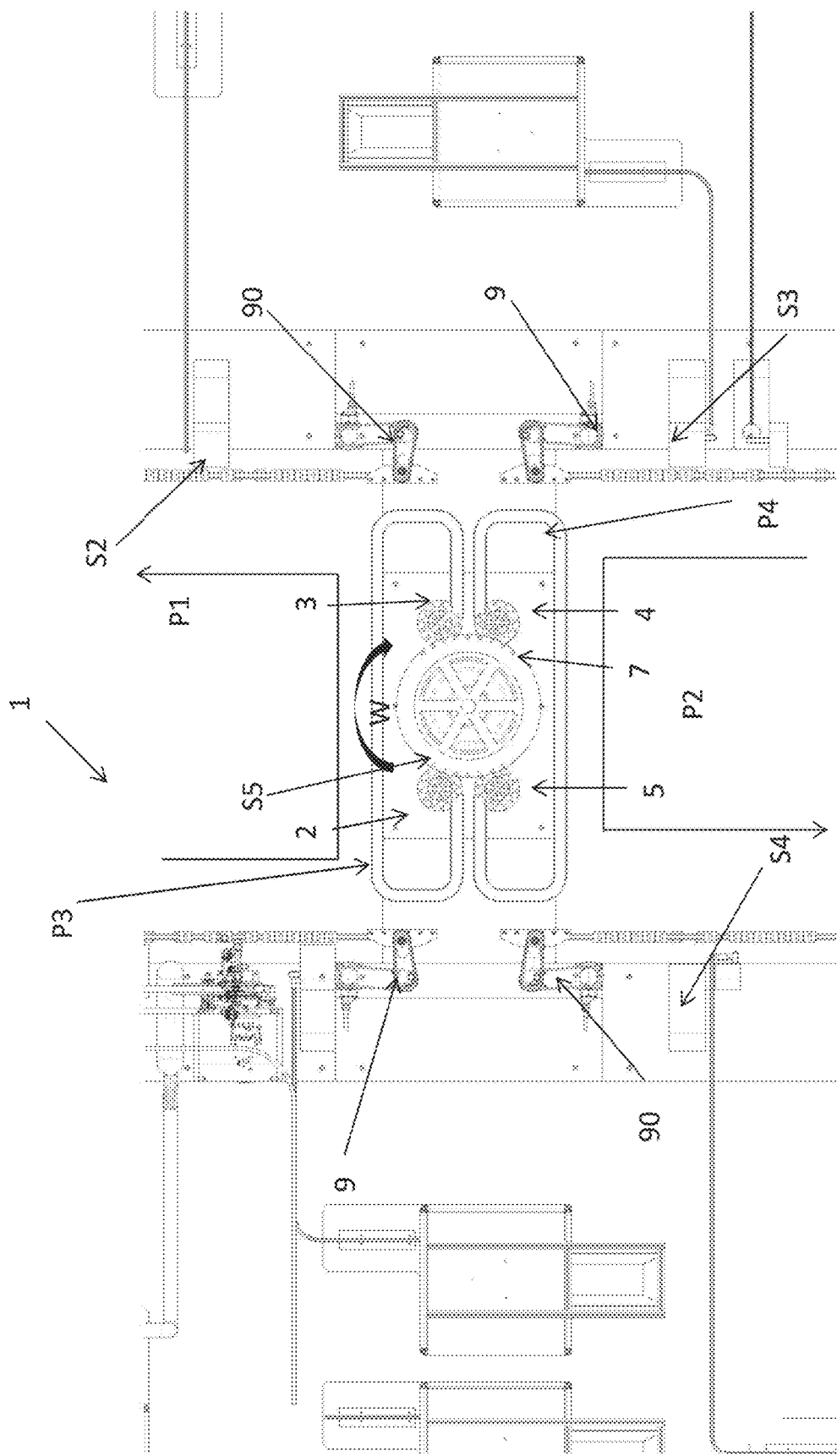
Figure 7:
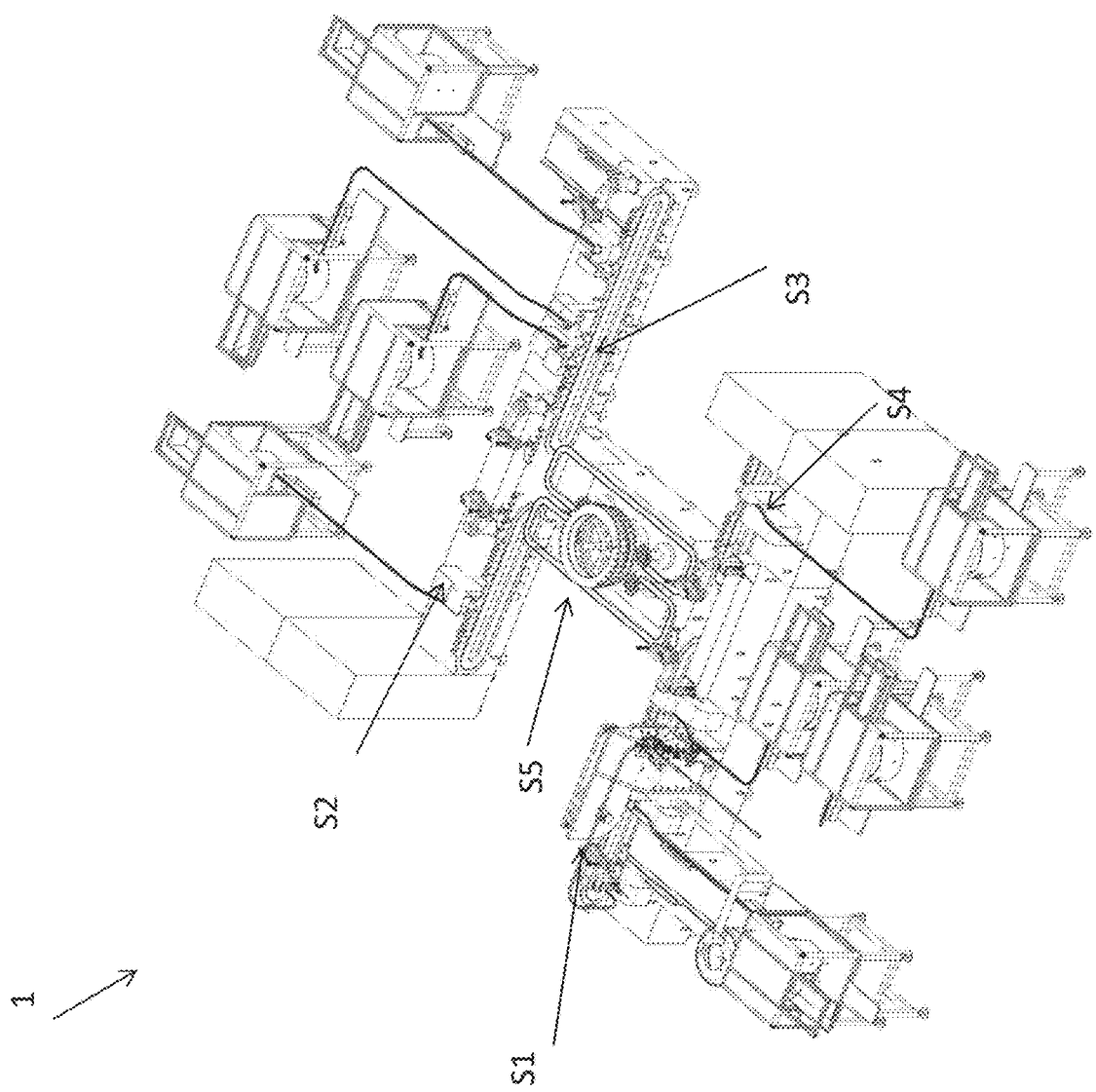
Figure 8:
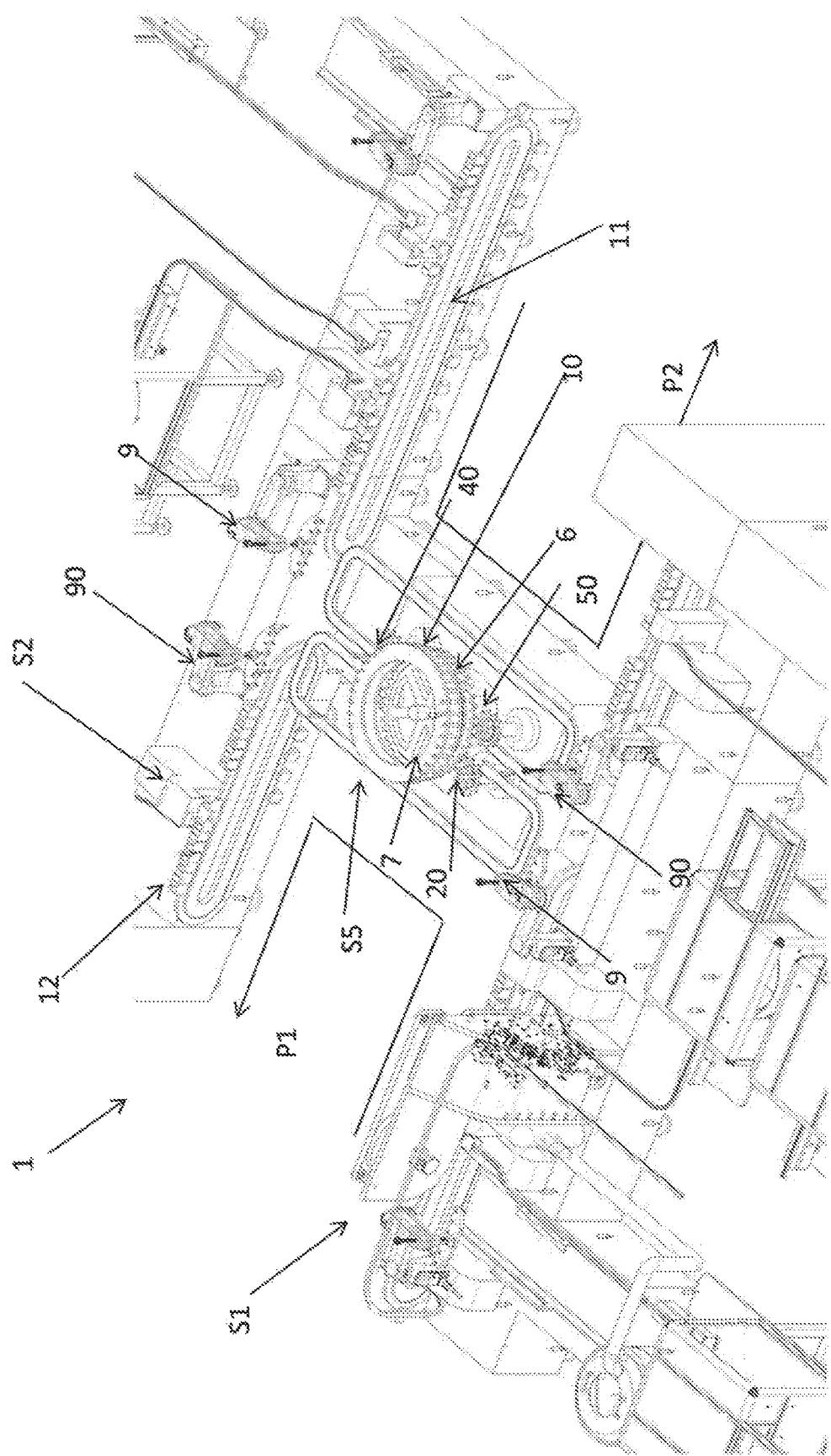
Figure 9:
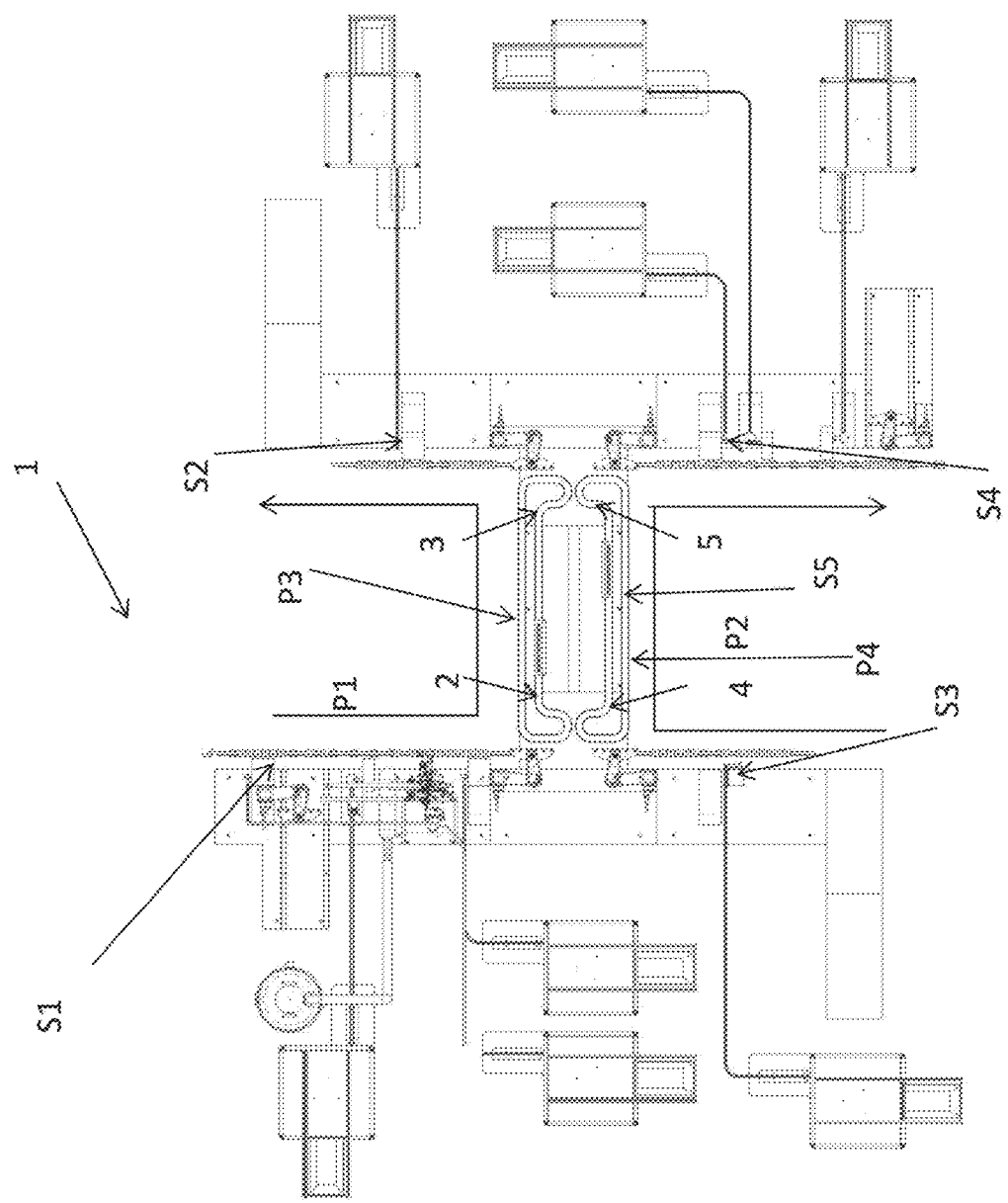
Figure 10:
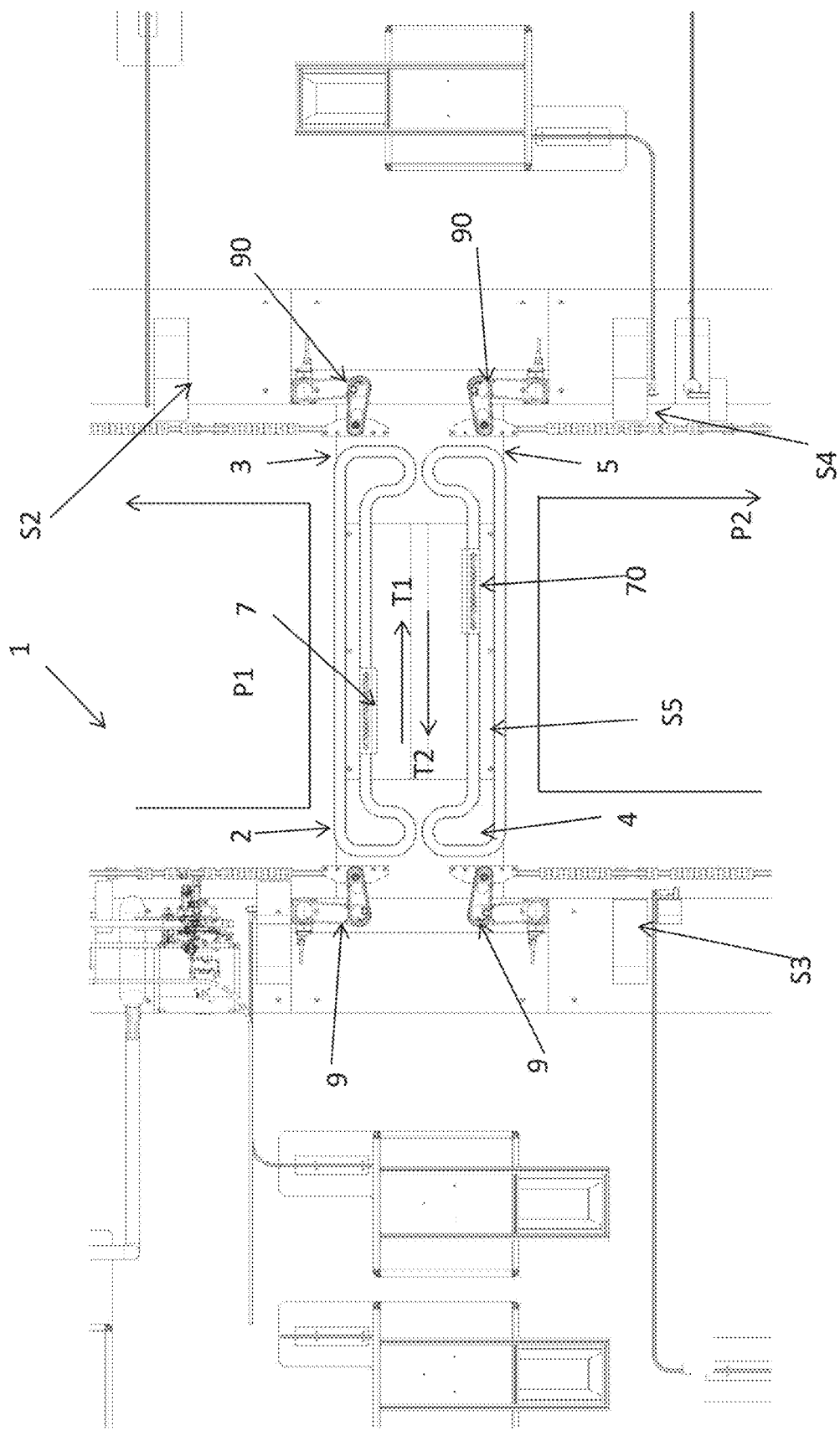
Figure 12:
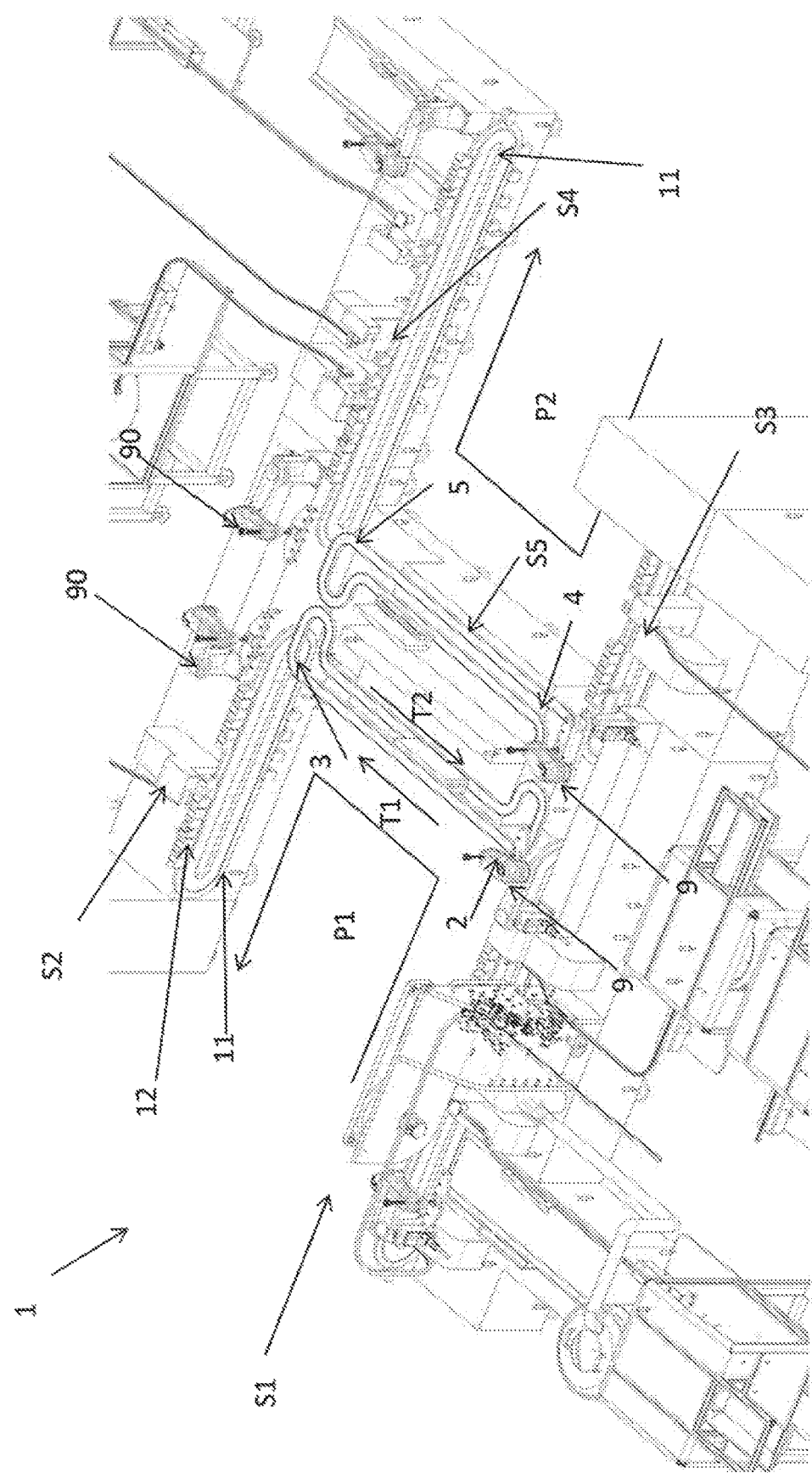

With reference to the accompanying drawings, the numeral 1 denotes a system according to this invention, for assembling and filling two groups of electronic cigarettes. The two groups of electronic cigarettes (not illustrated in the accompanying drawings) may be the same or different, as will become clearer as this description continues.

The expression "electronic cigarettes" is used to mean electronic cigarettes or components (parts) of electronic cigarettes, in both cases comprising cartridges (which need to be filled). Thus, reference to filling the electronic cigarettes in this specification and in the claims means filling the respective cartridges.

The system 1 according to the invention comprises (at least) a first working station S1 and (at least) a second working station S2 configured to perform assembly and/or inspection operations on a first group of electronic cigarettes. The first working station S1 and the second working station S2 are disposed, respectively; upstream and downstream of a first conveying path P1 of the first group of electronic cigarettes. Clearly, it is understood that other assembly and/or inspection stations may be provided along the first conveying path P1.

The system 1 also comprises at least a third working station S3 and a fourth working station S4 configured to perform assembly and/or inspection operations on a second group of electronic cigarettes. The third working station S3 and the fourth working station (S4) are disposed, respectively, upstream and downstream of a second conveying path P2 of a second group of electronic cigarettes. Clearly, it is understood that other assembly and/or inspection stations may be provided along the second conveying path P2.

The system 1 further comprises a single filling station S5 configured to receive, at a first loading zone 2, the first group of electronic cigarettes from the first working station S1 and, at a second loading zone 4, the second group of electronic cigarettes from the third working station S3; to fill the first group of electronic cigarettes and the second group of electronic cigarettes with at least one filling product; and to release the first group of filled electronic cigarettes (that is, with the respective filled cartridges) at a first unloading zone 3 and the second group of filled electronic cigarettes at a second unloading zone 5 towards the second working station S2 and towards the fourth working station S4, respectively.

The filling product is preferably a liquid product. Alternatively, it is, for example, a powder product.

With reference to the accompanying drawings, the filling station S5 is disposed between the first working station S1 and the second working station S2 and between the third working station S3 and the fourth working station S4. More in detail, the filling station S5 occupies a stretch of the first conveying path P1 and a stretch of the second conveying path P2.

Advantageously, the system 1 according to this invention allows setting up a single filling station S5 which fills the two groups of electronic cigarettes which are assembled at different stations, thus reducing the overall dimensions of the installation compared to an installation with two different filling stations. In other words, the filling station S5 operates on both groups of electronic cigarettes, thanks to the presence of the first and second loading zones 2 and 4, which are separate from each other, and of the first and second unloading zones 3 and 5, which are separate from each other.

Furthermore, the aforementioned system 1 allows increasing overall productivity because two groups of electronic cigarettes, even differing in structure or shape, can be assembled and filled simultaneously.

Another advantage of the proposed system 1 is its high flexibility in the event of malfunctions and/or special needs. In effect, if necessary, it is possible to assemble/inspect and fill only one of the two groups of electronic cigarettes.

In one embodiment of the invention, illustrated in FIGS. 1-8, the filling station S5 comprises housings 6 positioned to form a circular path 10 and rotatable in a first rotation direction W about the axis of the circular profile 10 to receive the first group of electronic cigarettes and the second group of electronic cigarettes. The filling station S5 also comprises a first group of filling heads 7 for filling the first group of electronic cigarettes and the second group of electronic cigarettes when disposed at the housings 6. In this embodiment, along the circular profile 10, the first unloading zone 3 is disposed between the first loading zone 2 and the second loading zone 4, and the second unloading zone 5 is disposed between the second loading zone 4 and the first loading zone 2. This advantageously allows controlling the filling of the first group of electronic cigarettes and of the second group of electronic cigarettes separately. In other words, the two filling paths (from the first loading zone 2 to the first unloading zone 3, and from the second loading zone 4 to the second unloading zone 5) do not interfere with each other.

Preferably, the first loading zone 2 and the second loading zone 4 are disposed at opposite quadrants of the circular profile 10.

Again preferably, the first unloading zone 3 and the second unloading zone 5 are also disposed at opposite quadrants of the circular profile 10, different from those at which the first loading zone 2 and the second loading zone 4 are disposed.

In the preferred embodiment, the first loading zone 2 and the second loading zone 4 are disposed in two different semicircles of the circular profile 10. In other words, the first group of electronic cigarettes and the second group of electronic cigarettes are conveyed towards the filling station S5 in two opposite conveying directions substantially along the same line.

In the embodiment illustrated in FIGS. 5-8, the first group of filling heads 7 is mounted to a carousel having a circular profile, positioned above the housings 6 and rotatable about its axis in the first rotation direction W simultaneously with the housings 6. The axis of rotation of the carousel is preferably parallel to, and still more preferably, coincident with, the axis of rotation of the circular profile 10 defined by the housings 6.

According to the embodiment just described, the number of filling heads 7 is equal to the number of housings 6 which receive the electronic cigarettes.

In this embodiment, therefore, the filling station S5 is a horizontally oriented carousel which rotates continuously about the respective vertical axis. For example, the first group of filling heads 7 is also movable axially between an idle position and an operating position, where the operating position is axially below the idle position and where the electronic cigarettes are filled.

In a different embodiment, illustrated in FIGS. 1-4, the first group of filling heads fills the first group of electronic cigarettes and the filling station S5 also comprises a second group of filling heads 70 to fill the second group of electronic cigarettes. More in detail, the first group of filling heads 7 and the second group of filling heads 70 are mounted to a first sector 8 and a second sector 80, respectively; In the accompanying drawings, the first sector 8 and the second sector 80 have the shape of corresponding circular sectors.

The first sector 8 and the second sector 80 are rotatable about a common axis of rotation in the first rotation direction W while the electronic cigarettes of the first group of cigarettes and the second group of cigarettes are being filled, performing a forward stroke, and in a second rotation direction, opposite to the first rotation direction W, after the electronic cigarettes of the first group of cigarettes and the second group of cigarettes have been filled, performing a return stroke.

With reference to FIGS. 1-4, the axis of rotation of the first sector 8 and of the second sector 80 is a vertical axis. This axis of rotation is preferably parallel to, and still more preferably, coincident with, the axis of rotation of the circular profile 10 defined by the housings 6 (as in the case illustrated).

In this embodiment, unlike the embodiment described previously, the filling heads move with alternating rotary motion along respective forward strokes (during which they fill the cartridges) and return strokes (during which they are idle, that is to say, they do not fill the electronic cigarettes) (rotational following). For example, the first group of filling heads 7 and the second group of filling heads 70 are also movable axially between an idle position and an operating position, where the operating position is axially below the idle position and where the electronic cigarettes are filled.

In this case, too, again with reference to FIGS. 1-4, the first group of electronic cigarettes and the second group of electronic cigarettes are conveyed towards the filling station S5 in two opposite conveying directions substantially along the same line.

In the embodiment described above, the filling product may be different for the first group of electronic cigarettes and for the second group of electronic cigarettes: that is to say, the first group of filling heads 7 and the second group of filling heads 70 may dispense different filling products. Advantageously, this aspect further increases the flexibility of the system 1, which is capable of filling two groups of electronic cigarettes that differ also in the product they are filled with.

With reference to the two embodiments described above, there are provided at the first and second loading zones 2 and 4 and at the first and second unloading zones 3 and 5, corresponding transfer devices 20, 40, 30, 50 (shown only in FIGS. 4 and 8), for example of the star wheel type, which transfer the electronic cigarettes into the housings 6 and disengage them from the housings 6.

In yet another different embodiment, illustrated in FIGS. 9-12, the housings 6 comprise at least a first row of housings and at least a second row of housings, parallel to each other, in order to receive the first group of electronic cigarettes and the second group of electronic cigarettes, respectively. The two rows of housings are movable translationally in a first translation direction T1 and in a second translation direction T2, opposite to the first translation direction T1. The two rows of housings are preferably two straight, parallel rows of housings.

In this case, the filling station S5 comprises a first group of filling heads 7 to fill the first group of electronic cigarettes, and a second group of filling heads 70 to fill the second group of electronic cigarettes. The first group of filling heads 7 and the second group of filling heads 70

(which are, for example, mounted to respective supports) are movable translationally in the first translation direction T1 and in the second translation direction T2 in the same way as the housings 6 (linear following).

In this case, too, the filling heads 7 of the first group and 70 of the second group are also movable vertically between an idle position and an operating position, where the operating position is axially below the idle position and where the electronic cigarettes are filled.

For example, the first group of filling heads 7 fills the first group of electronic cigarettes during a forward stroke in the first translation direction T1 and the second group of filling heads 70 fills the second group of electronic cigarettes during a forward stroke in the second translation direction T2. In other words, during the respective filling operations, the first and second groups of electronic cigarettes are moved along the same line in opposite directions (situation not illustrated).

Alternatively, with reference to FIGS. 9-12, the first group of filling heads 7 and the second group of filling heads 70 fill the first group and the second group of electronic cigarettes during a forward stroke in the first translation direction T1. In other words, during the respective filling operations, the first and second groups of electronic cigarettes are moved along the same line and in the same direction.

Preferably, in the embodiment described above, to reduce overall dimensions even more, the first loading zone 2, the first unloading zone 3, the second loading zone 4 and the second unloading zone 5 are aligned in twos (that is to say, the first loading zone 2 is aligned with the second unloading zone 5 or with the second loading zone 4, depending on the embodiment adopted).

In the embodiment described above, the filling product may be different for the first group of electronic cigarettes and for the second group of electronic cigarettes: that is to say, the first group of filling heads 7 and the second group of filling heads 70 may dispense different filling products. Advantageously, this aspect further increases the flexibility of the system 1, which is capable of filling two groups of electronic cigarettes that differ also in the product they are filled with.

Figure 13:
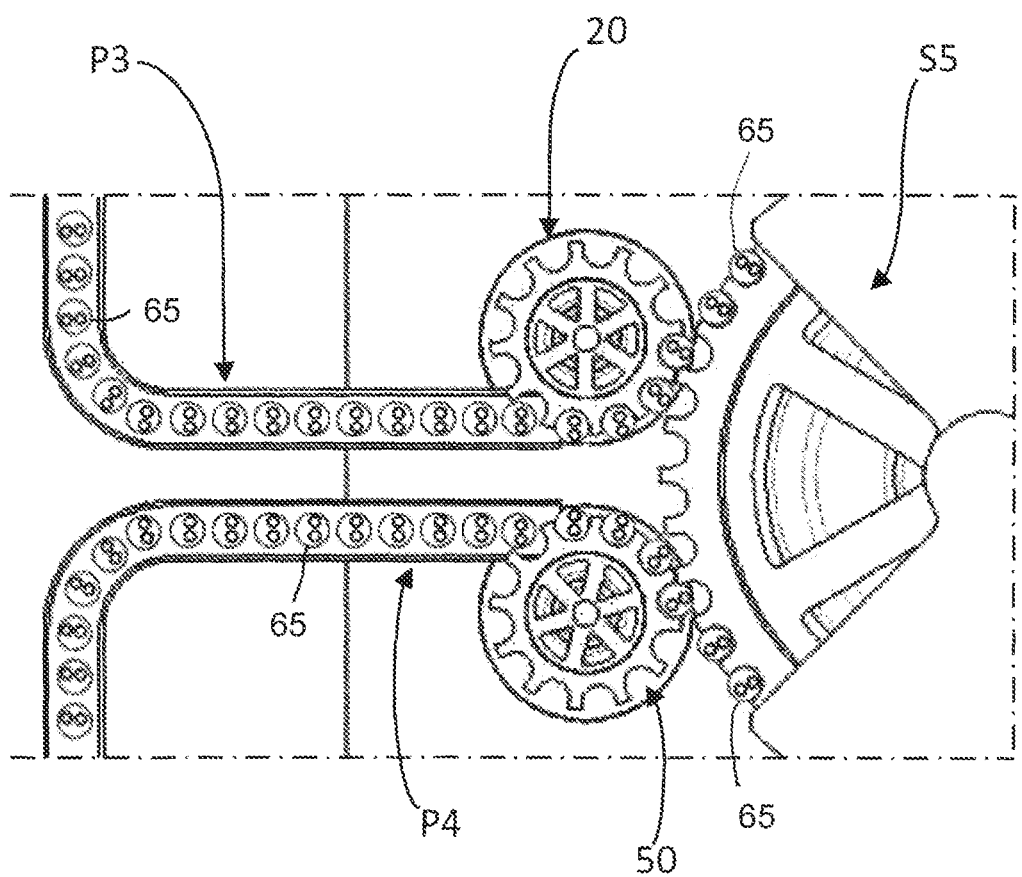
FIG. 13 shows a support container according to the invention.

For example, the system 1 according to the invention comprises a plurality of support containers (also known as buckets 65, see FIG. 13) for supporting the electronic cigarettes of the first group of electronic cigarettes and of the second group of electronic cigarettes while they are being filled in the filling station S5. With reference to the embodiments described above, the housings 6 of the filling station S5 are configured to receive the containers with the electronic cigarettes inside them. Use of these support containers is necessary because the electronic cigarettes or the respective parts thereof (such as the cartridges, for example) are of reduced size, and in some cases are fragile or have unstable positions which would make them difficult to fill.

According to this embodiment, the system 1 comprises first pickup means 9, for picking up the first group of electronic cigarettes and the second group of electronic cigarettes leaving the first working station S1 and the third working station S3 and for placing them in the support containers.

The system 1 also comprises second pickup means 90, for picking up the first group of electronic cigarettes and the second group of electronic cigarettes from the support containers after leaving the filling station S5.

As shown in the drawings, the first pickup means 9 and the second pickup means 90 comprise a plurality of robotized arms (known as "pick and place" arms).

In this embodiment, the system 1 comprises a first auxiliary path P3 which connects the first unloading zone 3 to the first loading zone 2, on the outside of the filling station S5; and a second auxiliary path P4 which connects the second unloading zone 5 to the second loading zone 4, on the outside of the filling station S5. The aforementioned support containers are conveyed first towards the first loading zone 2 and towards the second loading zone 4 to allow filling the electronic cigarettes, and then along the first auxiliary path P3 and along the second auxiliary path P4 after the cigarettes have been picked up from the containers.

In other words, after receiving the electronic cigarettes of the first group and of the second group from the first pickup means 9, the support containers support the electronic cigarettes while the latter are being filled and once the electronic cigarettes have been filled and picked up by the second pickup means 90, the support containers return empty along the first and second auxiliary paths P3 and P4 to the first and second loading zones 2 and 4.

In the preferred embodiment illustrated, the first conveying path P1 and the second conveying path P2 each define a C-shaped profile (with the ends of the C facing outwards) and are symmetrical to each other relative to the filling station S5 (that is, about an axis passing through the filling station S5).

Below, for greater clarity, is a description of how the system 1 according to the invention operates, with reference in particular, by way of example, to the first group of electronic cigarettes.

The first group of electronic cigarettes reaches the first working station S1, where it undergoes an operation and/or an inspection. The first group of electronic cigarettes is then fed along a first stretch of the first conveying path P1, where other assembly and/or inspection stations may be located, until it comes in proximity to the first pickup means 9. The latter are activated and pick up the electronic cigarettes of the first group and place them in the support containers, on the first auxiliary path P3, in proximity to the first loading zone 2. The support containers, with the electronic cigarettes inside them, are received into the filling station S5, where the filling heads (according to any of the variants described above) fill them with the filling product. Once the cigarettes have been filled, the second pickup means 90 pick them up and place them downstream of the filling station S5, along the first conveying path, which takes the electronic cigarettes to the third working station S3 (and to other stations, if any, along the first conveying path) and then feeds them out of the system 1. In the meantime, the support containers which are now empty are brought back along the first auxiliary path P3 to the first loading zone 2, where each of them once again receives an electronic cigarette of the first group of electronic cigarettes.

At the same time, the system 1 can operate on the second group of electronic cigarettes in the same way as described for the first group of electronic cigarettes.

The first group of electronic cigarettes can be brought from the first working station S1 to the first pickup means 9, and from the second pickup means 90 to the second working station S2, for example by linear motor conveyors 11 with independent carriages 12, configured to receive and hold electronic cigarette parts. The same applies to the second group of electronic cigarettes (see FIGS. 4, 8, 12).

By suitably setting up different working stations along the first conveying path P1 and along the second conveying path P2, it is, if necessary, possible to invert the feed directions of the first group of electronic cigarettes and of the second group of electronic cigarettes (obviously by inverting the conveying directions). Thus, the system 1 is advantageously made even more flexible.

The invention claimed is:

1. A system for assembling and filling two groups of electronic cigarettes, comprising:
   a first working station and a second working station configured to perform assembly and/or inspection operations on a first group of electronic cigarettes; the first working station and the second working station being disposed upstream and downstream of a first conveying path, respectively;
   a third working station and a fourth working station configured to perform assembly and/or inspection operations on a second group of electronic cigarettes; the third working station and the fourth working station being disposed upstream and downstream of a second conveying path, respectively;
   a single filling station configured for filling the first group of electronic cigarettes and the second group of electronic cigarettes, the filling station including housings,
   a plurality of support containers for supporting the electronic cigarettes of the first group of electronic cigarettes and of the second group of electronic cigarettes while the electronic cigarettes of the first group of electronic cigarettes and of the second group of electronic cigarettes are being filled in the filling station, the support containers configured for being received by the housings of the filling station;
   a first pickup system, for picking up the first group of electronic cigarettes and the second group of electronic cigarettes leaving the first working station and the third working station, respectively, and for placing in the support containers the first group of electronic cigarettes and the second group of electronic cigarettes leaving the first working station and the third working station;
   the single filling station being configured to receive in the housings, at a first loading zone, the support containers containing the first group of electronic cigarettes from the first working station and, at a second loading zone, the support containers containing the second group of electronic cigarettes from the third working station; to fill the first group of electronic cigarettes and the second group of electronic cigarettes with at least one filling product while the electronic cigarettes are disposed in the support containers at the housings; and to release the first group of filled electronic cigarettes at a first unloading zone and the second group of filled electronic cigarettes at a second unloading zone towards the second working station and towards the fourth working station, respectively;
   a second pickup system, for picking up the first group of electronic cigarettes and the second group of electronic cigarettes from the support containers leaving the filling station;
   a first auxiliary path which connects the first unloading zone to the first loading zone, outside of the filling station;
   a second auxiliary path which connects the second unloading zone to the second loading zone, outside of the filling station; the support containers being conveyed along the first auxiliary path and along the second auxiliary path after the first group of electronic cigarettes and the second group of electronic cigarettes have been picked up from the support containers;
   wherein, at the first and second loading zones, said system includes first transfer devices positioned between said first pick up system and the filling station, said first transfer devices being configured to transfer the electronic cigarettes along with the respective support containers into the housings;
   wherein, at the first and second unloading zones, said system includes second transfer devices positioned between the filling station and said second pick up system, said second transfer devices being configured to disengage the electronic cigarettes along with the respective support containers from the housings;
   wherein said first transfer devices have a star wheel configuration and said first transfer devices are positioned downstream of the first pick up system so that said first transfer devices receive the electronic cigarettes along with the respective container and release the electronic cigarettes along with the respective container to the filling station;
   wherein said second transfer devices have a star wheel configuration and said second transfer devices are positioned upstream of the second pick up system so that said second transfer devices receive the electronic cigarettes along with the respective container from the filling station and release the electronic cigarettes along with the respective container;
   wherein said first transfer devices are configured to remove the electronic cigarettes along with the respective container respectively from the first auxiliary path and the second auxiliary path and to release the electronic cigarettes along with the respective container to the filling station; and
   wherein said second transfer devices are configured to receive the electronic cigarettes along with the respective container from the filling station and to feed the electronic cigarettes along with the respective container respectively to the first auxiliary path and the second auxiliary path.

2. The system according to claim 1,
   wherein the housings are positioned along a circular path and rotatable in a first rotation direction about an axis of the circular path to receive the first group of electronic cigarettes and the second group of electronic cigarettes;
   wherein the filling station further includes a first group of filling heads for filling the first group of electronic cigarettes and the second group of electronic cigarettes when disposed at the housings;
   wherein along the circular path, the first unloading zone is disposed between the first loading zone and the second loading zone, and the second unloading zone is disposed between the second loading zone and the first loading zone.

3. The system according to claim 2, wherein the first loading zone and the second loading zone are disposed at opposite quadrants of the circular path.

4. The system according to claim 3, wherein the first loading zone and the second loading zone are disposed in two different semicircles of the circular path.

5. The system according to claim 2, wherein the first group of filling heads is mounted to a carousel having a circular profile, positioned above the housings and rotatable about an axis of the carousel in the first rotation direction simultaneously with the housings.

6. The system according to claim 2,
   wherein the first group of filling heads are configured to fill the first group of electronic cigarettes and wherein the filling station comprises a second group of filling heads configured to fill the second group of electronic cigarettes;

the first group of filling heads and the second group of filling heads being mounted to a first sector and a second sector of the carousel, respectively;

the first sector and the second sector being rotatable about a common axis of rotation in the first rotation direction while the electronic cigarettes of the first group of cigarettes and the second group of cigarettes are being filled, performing a forward stroke, and in a second rotation direction, opposite to the first rotation direction, after the electronic cigarettes of the first group of cigarettes and the second group of cigarettes have been filled, performing a return stroke.

7. The system according to claim 6, wherein the first group of filling heads and the second group of filling heads dispense different filling products of the at least one filling product.

8. The system according to claim 1, wherein the first conveying path and the second conveying path each define a C-shaped profile and are symmetrical to each other about an axis passing through the filling station.

9. The system according to claim 1, wherein, at the first and second loading zones, both the first and second auxiliary paths comprise a straight inlet section and where, at the first and second unloading zones, both the first and second auxiliary paths comprise a straight outlet section, said straight inlet sections and said straight outlet sections being outside of the filling station.

10. The system according to claim 9, wherein each straight inlet section is parallel with respect to the corresponding straight outlet section.

11. The system according to claim 9, wherein the straight inlet sections and the straight outlet sections are all parallel to each other.

12. The system according to claim 1, wherein the first and the second auxiliary path comprises a rail whose cross-section is U-shaped.

13. The system according to claim 1, wherein, along the first auxiliary path, each container along with the respective electronic cigarette is slidable independently of the other containers.

14. The system according to claim 1, wherein, along the second auxiliary path, each container along with the respective electronic cigarette is slidable independently of the other containers.

* * * * *